(12) United States Patent
Lee

(10) Patent No.: US 6,916,556 B2
(45) Date of Patent: Jul. 12, 2005

(54) PERPENDICULAR MAGNETIC RECORDING MEDIUM

(75) Inventor: Byung-kyu Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 133 days.

(21) Appl. No.: 10/032,103

(22) Filed: Dec. 31, 2001

(65) Prior Publication Data

US 2002/0086187 A1 Jul. 4, 2002

(30) Foreign Application Priority Data

Jan. 3, 2001 (KR) .............................. 2001-155

(51) Int. Cl.⁷ .............................. G11B 5/66; G11B 5/70
(52) U.S. Cl. .......................... 428/694 TS; 428/694 TM; 428/336
(58) Field of Search .......................... 428/694 TS, 336, 428/694 TM, 900, 611

(56) References Cited

U.S. PATENT DOCUMENTS

| | | |
|---|---|---|
| 5,378,548 A | 1/1995 | Torii et al. |
| 5,536,585 A | 7/1996 | Futamoto et al. |
| 5,863,661 A | 1/1999 | Sui et al. |
| 6,248,416 B1 * | 6/2001 | Lambeth et al. ........... 428/65.3 |
| 6,403,203 B2 * | 6/2002 | Futamoto et al. ........... 428/212 |
| 6,468,670 B1 * | 10/2002 | Ikeda et al. ................. 428/611 |
| 6,495,252 B1 * | 12/2002 | Richter et al. .............. 428/336 |
| 6,537,638 B2 | 3/2003 | Do et al. |

FOREIGN PATENT DOCUMENTS

JP         2000-215432         * 8/2000

* cited by examiner

*Primary Examiner*—Holly Rickman
(74) *Attorney, Agent, or Firm*—Burns, Doane, Swecker & Mathis, L.L.P.

(57) ABSTRACT

Provided is a perpendicular magnetic recording medium in which a perpendicular orientation promoting underlayer is formed between a substrate and a perpendicular magnetic recording layer for inducing the perpendicular orientation of the perpendicular magnetic recording layer, the perpendicular magnetic recording medium further including a crystal growth discontinuation layer between the substrate and the perpendicular orientation promoting underlayer for suppressing continuous crystal growth from the underlayer to the perpendicular magnetic recording layer. The effective suppression of crystal growth in the perpendicular magnetic recording layer results in low noise levels. Therefore, the perpendicular magnetic recording medium has high-density recording applications with increased signal-to-noise ratio.

16 Claims, 4 Drawing Sheets

PERPENDICULAR MAGNETIC RECORDING MEDIUM

Priority is claimed to Patent Application No. 2001-155, filed in the Republic of Korea on Jan. 3, 2001, herein incorporated by reference.

BACKGROUND OF THE INVENTION

1. Field of the Invention

The present invention relates to magnetic recording disks used in hard disk drives (HDDs), and more particularly, to a perpendicular magnetic recording disk with improved thermal stability of record information and high signal-to-noise (SNR) ratio.

2. Description of the Related Art

In longitudinal magnetic recording (LMR) applied to hard disk drives (HDDs), a major external data storage device of computers, the size of a data record domain in a magnetic disk has decreased with microstructure as the need for high-density data recording increases. However, this decrease in size makes the data record domains susceptible to removal by thermal energy generated by operation of the HDD which is more dominant than magnetostatic energy from the data record domain. This is referred to as the super paramagnetic effect. To overcome the super paramagnetic effect, the LMR technique has been replaced by a perpendicular magnetic recording (PMR) technique for HDD applications. The PMR technique uses a higher electrostatic energy and lower demagnetization energy compared to the LMR technique, so it is advantageous in high-density data recording. The high-density PMR technique also has enabled detection of a micro data domain in combination with advances in the manufacture of highly sensitive read heads.

In the PMR technique suitable for high-density magnetic recording, perpendicular magnetic anisotropy energy is exerted to orient the direction of magnetized domains perpendicular to the plane of a magnetic disk. Thus, head fields from a magnetic head should be induced to be perpendicular to the magnetic disk plane and thus parallel to the magnetized domains. To achieve this, a particular head capable of inducing a perpendicular magnetic field is required.

The schematic structure of a single-layer PMR medium is shown in FIG. 1. The single-layer PMR medium includes an underlayer 12 for promoting the perpendicular orientation of a perpendicular magnetic recording (PMR) layer 13 formed over the underlayer 12, the PMR layer 13 having the perpendicular magnetic anisotropy energy to keep the perpendicular orientation of the data record domain, a protective layer 14 for protecting the PMR layer 13 from external impacts, and a lubricant layer 15.

The PMR layer 13 has the perpendicular magnetic anisotropy energy with a magnetic easy axis oriented perpendicular to the plane of the PMR layer 13 due to the underlayer 12. Therefore, perpendicular data recording can be achieved by perpendicular magnetic field components from a ring-type head.

Recording density in a perpendicular magnetic recording mechanism is largely affected by the characteristics of the PMR layer and the perpendicular orientation promoting underlayer (hereinafter, simply referred to as "underlayer").

In a conventional PMR medium, as shown in FIG. 1, an underlayer disposed below a PMR layer to promote perpendicular magnetic orientation of the PMR layer is formed of titanium (Ti), platinum (Pt), gold (Au), or palladium (Pd), which has good perpendicular magnetic orientation properties. In this case, crystal growth in the underlayer is continuous to the PMR layer in an aligned grain structure, thereby increasing the grain size of the PMR layer. Such large grains result in greater noise with low signal-to-noise ratio (SNR).

SUMMARY OF THE INVENTION

To solve the above-described problems, it is an objective of the present invention to provide a perpendicular magnetic recording (PMR) medium in which an increase in grain size of a PMR layer due to continuous crystal growth of a perpendicular orientation promoting underlayer to the PMR layer in an aligned grain structure is suppressed.

To achieve the objective of the present invention, there is provided a perpendicular magnetic recording medium including a perpendicular orientation promoting underlayer between a substrate and a perpendicular magnetic recording layer for inducing the perpendicular orientation of the perpendicular magnetic recording layer, the perpendicular magnetic recording medium further comprising a crystal growth discontinuation layer between the perpendicular orientation promoting underlayer and the perpendicular magnetic recording layer for suppressing continuous crystal growth from the underlayer to the perpendicular magnetic recording layer.

It is preferable that the perpendicular orientation promoting underlayer is formed of at least one material selected from the group consisting of Pt, Au, Pd, Ti and an alloy of these materials. It is preferable that the crystal growth discontinuation layer has a thickness no greater than 20 nm. It is preferable that the crystal growth discontinuation layer is formed of at least one material selected from the group consisting of Ti, Ta, permalloy, and an alloy of these materials. It is preferable that the perpendicular magnetic recording layer is formed of a CoCr alloy. It is preferable that the perpendicular magnetic recording layer further comprises at least one material selected from the group consisting of B, Pt, Ta, V, Nb, Zr, Y, and Mo.

The PMR medium according to the present invention has good recording performance for a single-layer structure, a double-layer structure including a soft magnetic layer between a perpendicular orientation promoting underlayer and a substrate, or a pseudo double-layer structure including a soft magnetic layer between a perpendicular orientation promoting underlayer and a perpendicular magnetic recording layer. According to the present invention, the perpendicular magnetic recording layer may be formed of a multiple-layer as well as a single-layer.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

The principle of the present invention will be described in greater detail with reference to the appended drawings.

Figure 1:
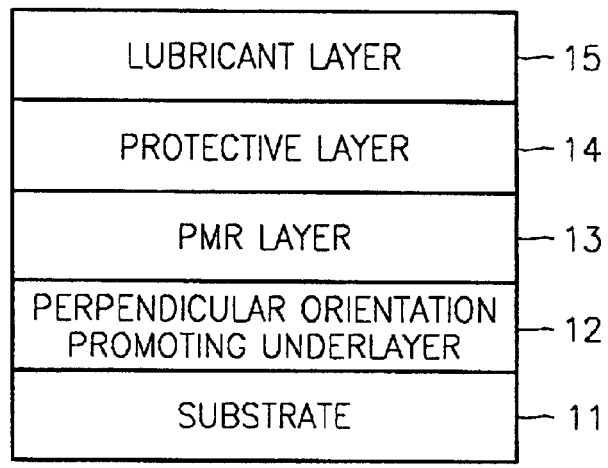
FIG. 1 is a sectional view showing the structure of a conventional perpendicular magnetic recording (PMR) medium.
Figure 2:
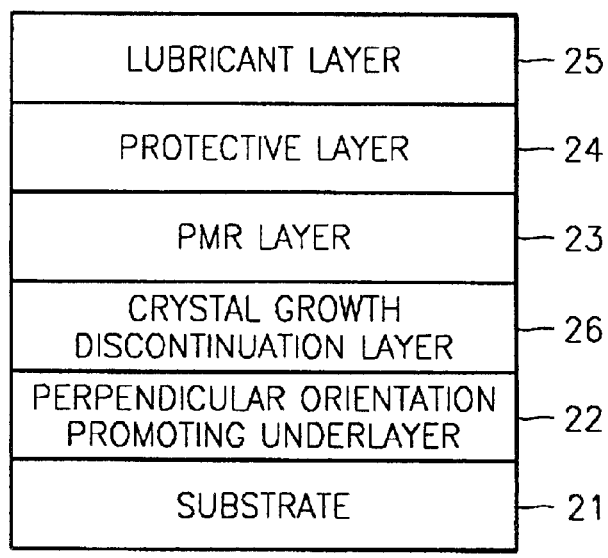
FIG. 2 is a sectional view showing the structure of a preferred embodiment of a PMR medium according to the present invention with a crystal growth discontinuation layer between a perpendicular orientation promoting underlayer and a PMR recording layer.

Referring to FIG. 2, a perpendicular magnetic recording (PMR) medium according to a preferred embodiment of the present invention is characterized by including a crystal growth discontinuation layer 26 between a perpendicular orientation promoting underlayer 22 and a PMR layer 23.

Figure 3:
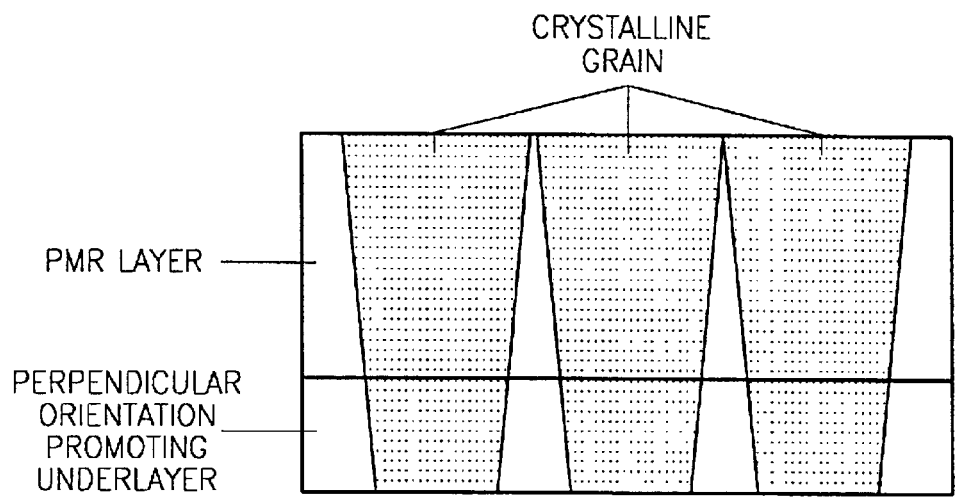
FIG. 3 is a partial enlarged view showing a crystal growth pattern and grain size in a PMR layer of a PMR medium without a crystal growth discontinuation layer.

FIG. 3 is a partial enlarged view showing a crystal growth pattern and grain size in a PMR layer of a PMR medium without a crystal growth discontinuation layer. As shown in FIG. 3, crystal growth in the perpendicular orientation promoting underlayer is continuous to the PMR layer in an aligned grain structure, thereby increasing the grain size of the PMR layer.

Figure 4:
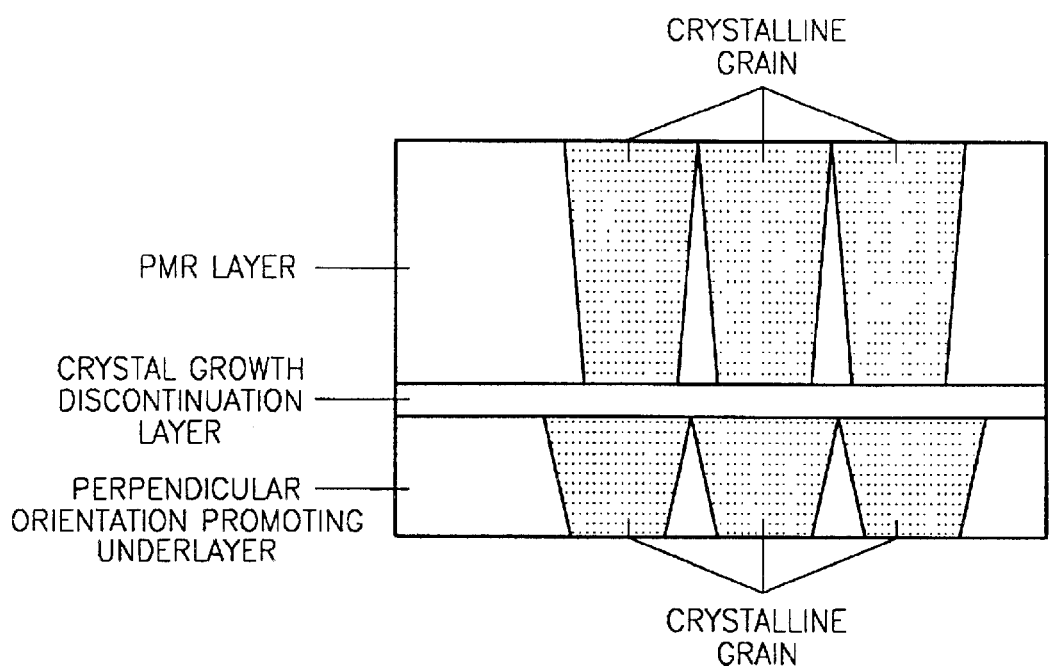
FIG. 4 is a partial enlarged view showing a crystal growth pattern and grain size in a PMR layer of a PMR medium with a crystal growth discontinuation layer.

FIG. 4 is a partial enlarged view showing a crystal growth pattern and grain size in a PMR layer of a PMR medium with a crystal growth discontinuation layer. As shown in FIG. 4, formation of the crystal growth discontinuation layer blocks continuous crystal growth from the perpendicular orientation promoting underlayer to the PMR and thereby allows growth of crystal for the PMR layer to start from the crystal growth discontinuation layer, thereby resulting in reduced grain size.

Depending on the materials being used for the perpendicular orientation promoting underlayer and the PMR layer, the material for the crystal growth discontinuation layer can be appropriately selected to provide such a crystal growth discontinuation effect. For a PMR layer formed of a CoCr alloy, titanium (Ti), tantalum (Ta), permalloy, or an alloy of these materials is preferred for the crystal growth discontinuation layer. It is preferably that the crystal growth discontinuation layer has a thickness of 20 nm or less to allow transfer of the perpendicular magnetic orientation property of the underlayer to the PMR layer. If the thickness of the crystal growth discontinuation layer is greater than 20 nm, the perpendicular magnetic orientation effect from the underlayer cannot be exerted on the PMR layer.

Such small grain sizes result in a low-noise perpendicular magnetic recording medium with increased SNR enabling high-density recording.

The present invention will be described in greater detail by means of the following examples. The following examples are for illustrative purposes and are not intended to limit the scope of the invention.

EXAMPLE 1

A Pt underlayer was deposited on a 0.635-mm-thick glass substrate to a thickness of 40 nm, and a Ti crystal growth discontinuation layer was deposited on the Pt underlayer to a thickness of 5 nm. A CoCr alloy PMR layer was deposited on the Ti crystal growth discontinuation layer to a thickness of 50 nm. A carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a signal-layer PMR disk.

EXAMPLE 2

A 500-nm-thick NiFe soft magnetic layer and a 10-nm-thick Pt underlayer were sequentially stacked on a glass substrate having a thickness of 0.635 mm, and a Ti crystal growth discontinuation layer was deposited on the Pt underlayer to a thickness of 5 nm. Next, a CoCr alloy PMR layer was deposited on the Ti crystal growth discontinuation layer to a thickness of 50 nm. A carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a double-layer PMR disk.

EXAMPLE 3

A 40-nm-thick Pt underlayer and a 10-nm-thick NiFe soft magnetic layer were sequentially formed on a 0.635-mm-thick glass substrate. Next, a Pt underlayer is formed as a perpendicular orientation promoting layer on the NiFe soft magnetic layer to a thickness of 5 nm, and a Ti crystal growth discontinuation layer was formed thereon to a thickness of 5 nm, followed by formation of a CoCr alloy PMR layer having a thickness of 50 nm. A carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a pseudo double-layer PMR disk.

EXAMPLE 4

A 40-nm-thick Pt underlayer and a 5-nm-thick Ti crystal growth discontinuation layer were sequentially formed on a 0.635-mm-thick glass substrate. Next, a 10-nm-thick NiFe soft magnetic layer and a 50-nm-thick CoCr alloy PMR layer were sequentially formed on the Ti crystal growth discontinuation layer. A carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a pseudo double-layer PMR disk.

COMPARATIVE EXAMPLE 1

A 50-nm-thick Ti underlayer and a 50-nm-thick CoCr alloy PMR layer were sequentially deposited on a glass substrate having a thickness of 0.635 mm. Next, a carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a conventional single-layer PMR disk.

COMPARATIVE EXAMPLE 2

A 50-nm-thick Ti underlayer and a 5-nm-thick NiFe soft magnetic layer were sequentially deposited on a glass substrate having a thickness of 0.635 mm, followed by formation of a 35-nm-thick CoCr alloy PMR layer. Next, a carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a conventional pseudo double-layer PMR disk.

Figure 5:
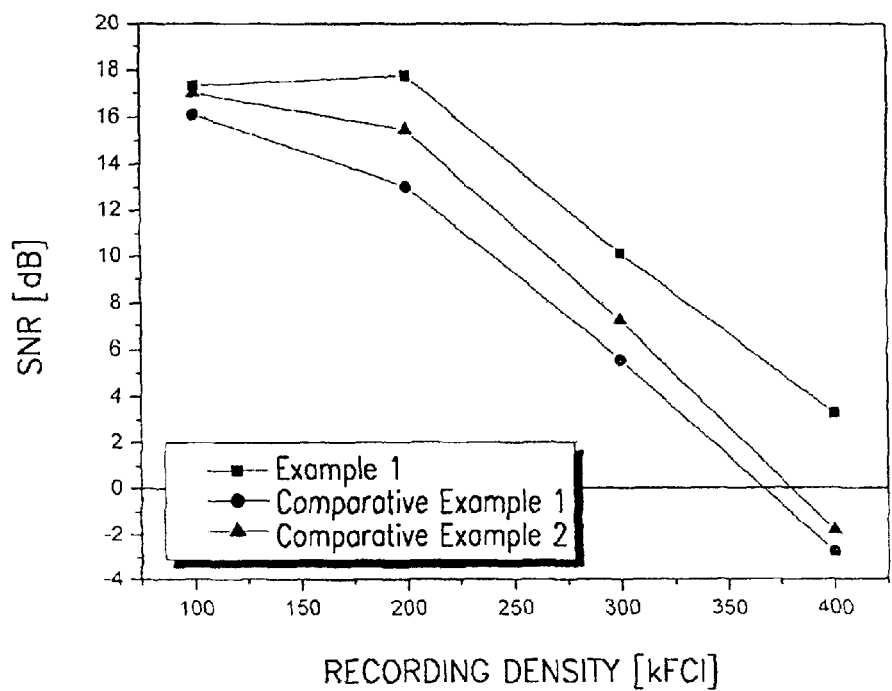
FIG. 5 is a graph of signal-to-noise ratio for PMR disks manufactured in Example 1 and Comparative Examples 1 and 2.

FIG. 5 is a graph of signal-to-noise ratio for the PMR disks manufactured in Example 1 and Comparative Examples 1 and 2. As shown in FIG. 5, the PMR disk according to the present invention with the Pt underlayer and the Ti crystal growth discontinuation layer shows a higher SNR than the conventional PMR disks.

Figure 6:
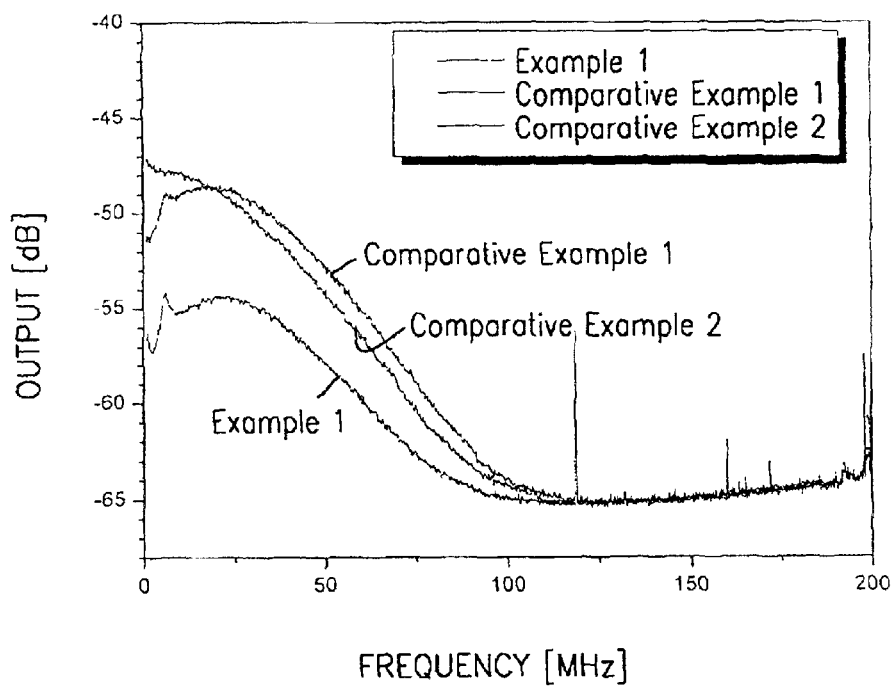
FIG. 6 shows spectra of noise at a high recording density of 600 kFCI (kilo Flux Charge per Inch) for the PMR disks manufactured in Example 1 and Comparative Examples 1 and 2.

FIG. 6 shows spectra of noise at a high recording density of 600 kFCI (kilo Flux Charge per Inch) for the PMR disks manufactured in Example 1 and Comparative Examples 1 and 2. As shown in FIG. 6, the PMR disk according to the present invention has a very low noise level compared to the conventional PMR disks.

Figure 7:
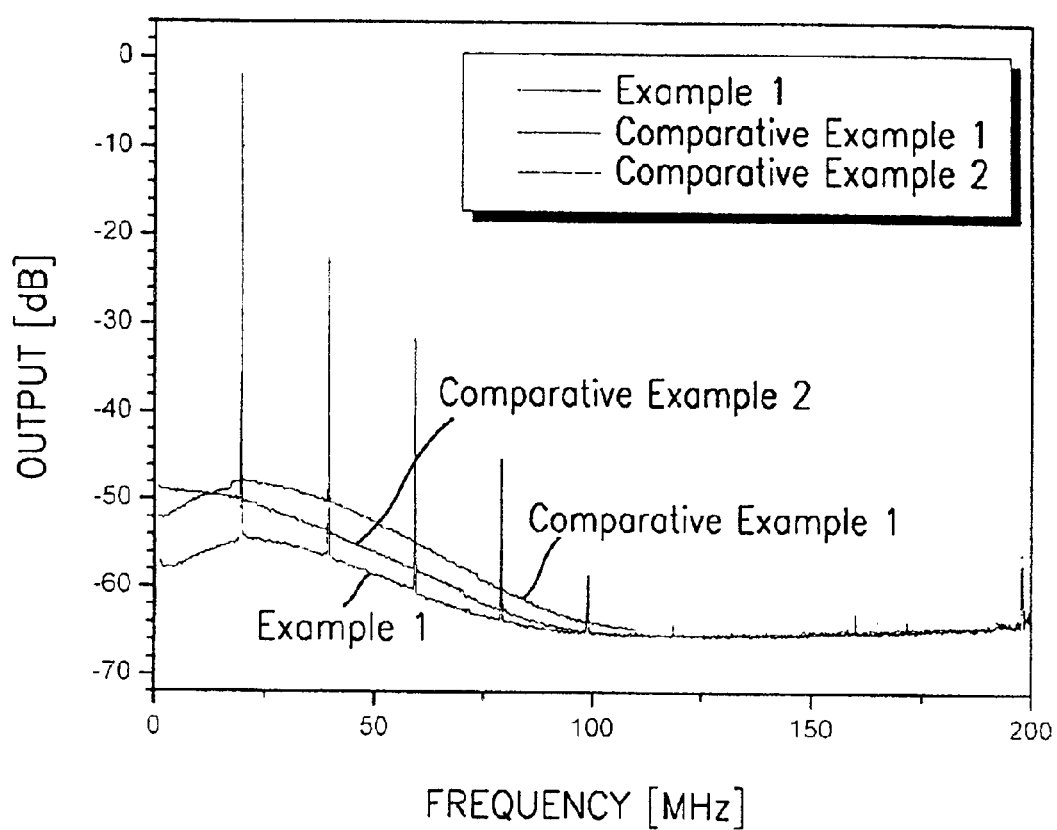
FIG. 7 shows spectra of noise at a low recording density of 100 kFCI for the PMR disks manufactured in Example 1 and Comparative Examples 1 and 2.

FIG. 7 shows spectra of noise at a low recording density of 100 kFCI for the PMR disks manufactured in Example 1 and Comparative Examples 1 and 2. As shown in FIG. 7, the PMR disk according to the present invention shows a low noise level even at a low recording density, compared to the conventional PMR disks.

As described above, a PMR medium according to the present invention that is characterized by including a crystal growth discontinuation layer between a perpendicular orientation promoting underlayer and a PMR layer can effectively suppress crystal growth in the PMR layer, resulting in low noise levels. Therefore, the PMR medium according to the present invention has high-density recording applications with increased SNR.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A perpendicular magnetic recording medium including a perpendicular orientation promoting underlayer between a substrate and a perpendicular magnetic recording layer for inducing the perpendicular orientation of the perpendicular magnetic recording layer, the perpendicular magnetic recording medium further comprising a crystal growth discontinuation layer between the perpendicular orientation promoting underlayer and the perpendicular magnetic recording layer for suppressing continuous crystal growth from the underlayer to the perpendicular magnetic recording layer, wherein the perpendicular orientation promoting underlayer is formed of at least one material selected from the group consisting of Pt, Au, Pd, and Ti, and wherein the crystal growth discontinuation layer has a thickness no greater than 20 nm.

2. The perpendicular magnetic recording medium of claim 1, wherein the crystal growth discontinuation layer is formed of at least one material selected from the group consisting of Ti, Ta, permalloy, and an alloy of these materials.

3. The perpendicular magnetic recording medium of claim 1, wherein the crystal growth discontinuation layer is formed of at least one material selected from the group consisting of Ti, Ta, permalloy, and an alloy of these materials.

4. The perpendicular magnetic recording medium of claim 1, wherein the perpendicular magnetic recording layer is formed of a CoCr alloy.

5. The perpendicular magnetic recording medium of claim 4, wherein the perpendicular magnetic recording layer further comprises at least one material selected from the group consisting of B, Pt, Ta, V, Nb, Zr, Y, and Mo.

6. The perpendicular magnetic recording medium of claim 1, further comprising a protective layer and a lubricant layer sequentially on the perpendicular magnetic recording layer.

7. A perpendicular magnetic recording medium including a perpendicular orientation promoting underlayer between a substrate and a perpendicular magnetic recording layer for inducing the perpendicular orientation of the perpendicular magnetic recording layer, the perpendicular magnetic recording medium further comprising a crystal growth discontinuation layer between the perpendicular orientation promoting underlayer and the perpendicular magnetic recording layer for suppressing continuous crystal growth from the underlayer to the perpendicular magnetic recording layer, wherein the perpendicular magnetic recording medium has a double-layer structure including a soft magnetic layer between the substrate and the perpendicular orientation promoting underlayer.

8. A perpendicular magnetic recording medium including a perpendicular orientation promoting underlayer between a substrate and a perpendicular magnetic recording layer for inducing the perpendicular orientation of the perpendicular magnetic recording layer, the perpendicular magnetic recording medium further comprising a crystal growth discontinuation layer between the perpendicular orientation promoting underlayer and the perpendicular magnetic recording layer for suppressing continuous crystal growth from the underlayer to the perpendicular magnetic recording layer, wherein the perpendicular magnetic recording medium has a double-layer structure with a soft magnetic layer between the perpendicular orientation promoting underlayer and the perpendicular magnetic recording layer.

9. The perpendicular magnetic recording medium of claim 1, wherein the perpendicular magnetic recording layer is formed of a CoCr alloy.

10. The perpendicular magnetic recording medium of claim 1, further comprising a protective layer and a lubricant layer sequentially on the perpendicular magnetic recording layer.

11. A perpendicular magnetic recording medium including a perpendicular orientation promoting underlayer between a substrate and a perpendicular magnetic recording layer for inducing the perpendicular orientation of the perpendicular magnetic recording layer, the perpendicular magnetic recording medium further comprising a crystal growth discontinuation layer between the perpendicular orientation promoting underlayer and the perpendicular magnetic recording layer for suppressing continuous crystal growth from the underlayer to the perpendicular magnetic recording layer, wherein the perpendicular magnetic recording medium has a double-layer structure including a soft magnetic layer between the substrate and the perpendicular orientation promoting underlayer.

12. A perpendicular magnetic recording medium including a perpendicular orientation promoting underlayer between a substrate and a perpendicular magnetic recording layer for inducing the perpendicular orientation of the perpendicular magnetic recording layer, the perpendicular magnetic recording medium further comprising a crystal growth discontinuation layer between the perpendicular orientation promoting underlayer and the perpendicular magnetic recording layer for suppressing continuous crystal growth from the underlayer to the perpendicular magnetic recording layer, wherein the perpendicular magnetic recording medium has a double-layer structure with a soft magnetic layer between the perpendicular orientation promoting underlayer and the perpendicular magnetic recording layer.

13. A perpendicular magnetic recording medium, comprising:
   a substrate;
   a perpendicular orientation promoting underlayer located on said substrate, wherein the perpendicular orientation promoting underlayer is formed of at least one material selected from the group consisting of Pt, Au, Pd, and Ti, and wherein the crystal growth discontinuation layer has a thickness no greater than 20 nm;
   a crystal growth discontinuation layer located on said perpendicular orientation promotion underlayer; and
   a perpendicular magnetic recording layer located on said crystal growth discontinuation layer,
   wherein said crystal growth discontinuation layer interrupts continuous crystal growth from the perpendicular orientation promoting underlayer to the perpendicular magnetic recording layer while maintaining a perpendicular magnetic orientation effect.

14. A perpendicular magnetic recording medium, comprising:
   a substrate;
   a perpendicular orientation promoting underlayer located on said substrate;
   a crystal growth discontinuation layer located on said perpendicular orientation promotion underlayer;
   a perpendicular magnetic recording layer located on said crystal growth discontinuation layer; and
   a soft magnetic layer interposed between said substrate and said perpendicular orientation promoting underlayer,
   wherein said crystal growth discontinuation layer interrupts continuous crystal growth from the perpendicular orientation promoting underlayer to the perpendicular magnetic recording layer while maintaining a perpendicular magnetic orientation effect.

15. A perpendicular magnetic recording medium, comprising:
   a substrate;
   a perpendicular orientation promoting underlayer located on said substrate,
   a crystal growth discontinuation layer located on said perpendicular orientation promotion underlayer;
   a perpendicular magnetic recording layer located on said crystal growth discontinuation layer; and
   a soft magnetic layer interposed between said perpendicular orientation promoting underlayer and said crystal growth discontinuation layer,
   wherein said crystal growth discontinuation layer interrupts continuous crystal growth from the perpendicular orientation promoting underlayer to the perpendicular magnetic recording layer while maintaining a perpendicular magnetic orientation effect.

16. A perpendicular magnetic recording medium, comprising:
   a substrate;
   a perpendicular orientation promoting underlayer located on said substrate;
   a crystal growth discontinuation layer located on said perpendicular orientation promotion underlayer;
   a perpendicular magnetic recording layer located on said crystal growth discontinuation layer;
   a soft magnetic layer located on said perpendicular orientation promoting underlayer; and
   a second perpendicular orientation promoting underlayer located on said soft magnetic layer, wherein said soft magnetic layer and said second perpendicular orientation promoting underlayer are interposed between said perpendicular orientation promoting underlayer and said perpendicular magnetic recording layer,
   wherein said crystal growth discontinuation layer interrupts continuous crystal growth from the perpendicular orientation promoting underlayer to the perpendicular magnetic recording layer while maintaining a perpendicular magnetic orientation effect.

* * * * *